US006973521B1

(12) United States Patent
Indiresan et al.

(10) Patent No.: US 6,973,521 B1
(45) Date of Patent: Dec. 6, 2005

(54) LOCK CONTROLLER SUPPORTING BLOCKING AND NON-BLOCKING REQUESTS

(75) Inventors: Atri Indiresan, Sunnyvale, CA (US); Felix Yuan, Fremont, CA (US); Iwan Kartawira, Cary, NC (US); John William Marshall, Cary, NC (US); Russell Schroter, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/572,037

(22) Filed: May 16, 2000

(51) Int. Cl.$^7$ .............................................. G06F 12/00
(52) U.S. Cl. ................................................... 710/200
(58) Field of Search ........................ 710/36, 44, 46, 710/47, 58, 200–240, 107–109; 709/213; 711/163

(56) References Cited

U.S. PATENT DOCUMENTS

| | | | | |
|---|---|---|---|---|
| 4,669,079 | A | * | 5/1987 | Blum ........................... 370/439 |
| 5,202,990 | A | * | 4/1993 | Saikawa ....................... 710/200 |
| 5,265,257 | A | * | 11/1993 | Simcoe et al. ................ 710/263 |
| 5,341,491 | A | * | 8/1994 | Ramanujan ................... 711/152 |
| 5,408,629 | A | * | 4/1995 | Tsuchiva et al. ............. 711/151 |
| 5,517,625 | A | * | 5/1996 | Takahashi .................... 710/108 |
| 5,740,401 | A | * | 4/1998 | Hanawa et al. .............. 711/152 |
| 5,761,659 | A | * | 6/1998 | Bertoni ........................... 707/8 |
| 5,898,691 | A | | 4/1999 | Liu |
| 5,903,455 | A | * | 5/1999 | Sharpe et al. .................. 700/83 |
| 5,918,057 | A | * | 6/1999 | Chou et al. .................. 710/260 |
| 6,088,757 | A | * | 7/2000 | Boonie et al. ............... 710/200 |
| 6,115,715 | A | * | 9/2000 | Traversat et al. ........... 707/100 |
| 6,178,429 | B1 | | 1/2001 | Cherf |
| 6,182,186 | B1 | * | 1/2001 | Daynes ........................ 710/200 |
| 6,237,043 | B1 | * | 5/2001 | Brown et al. ................ 709/316 |
| 6,330,649 | B1 | * | 12/2001 | Frank et al. ................. 711/163 |
| 6,529,983 | B1 | | 3/2003 | Marshall et al. |
| 2002/0038398 | A1 | * | 3/2002 | Morrison et al. ........... 710/200 |

FOREIGN PATENT DOCUMENTS

JP         403048962 A   *   3/1991   .......... G06F 13/36

OTHER PUBLICATIONS

"Lock Management Architecture" IBM Technical Disclosure Bulletin, vol. 31, Issue 5, pp. 125-128, Oct. 1, 1988.*
"Lock Management Architecture" IBM Technical Disclosure Bulletin, vol. 32, Issue 9A, pp. 214-217, Feb. 1, 1990.*
Structured Computer Organization, Third Edition, Andrew S. Tanenbaum, 1990, pp. 11-13.*
U.S. Appl. No. 09/432,464, Marshall et al., filed Nov. 3, 1999.
J. L. Hennessey & D. A. Patterson, Computer Architecture a Quantitative Approach, 1996, p. 694-708, Morgan Kaufmann Publishers, Inc., San Francisco.

* cited by examiner

Primary Examiner—Paul R. Myers
(74) Attorney, Agent, or Firm—Cesari and McKenna, LLP

(57) ABSTRACT

A lock controller supports both blocking and non-blocking lock requests issued by processors of a processing engine when attempting to access a shared resource of an intermediate network device. The non-blocking lock controller capability provides a processor with the flexibility to obtain other shared resources if the originally requested resource is not available. The blocking capability of the lock controller guarantees that each processor will eventually obtain the requested resource. By supporting both blocking and non-blocking capabilities, the lock controller provides increased flexibility and performance to the processors of the processing engine.

22 Claims, 5 Drawing Sheets

LOCK CONTROLLER SUPPORTING BLOCKING AND NON-BLOCKING REQUESTS

FIELD OF THE INVENTION

The present invention relates generally to computer architecture and, more particularly, to processor synchronization within a programmable arrayed processing engine.

BACKGROUND OF THE INVENTION

Computer architecture generally defines the functional operation, including the flow of information and control, among individual hardware units of a computer. One such hardware unit is a processing engine that contains arithmetic and logic processing circuits organized as a set of data paths. In some implementations, the data path circuits may be configured as a processor having a register file of general-purpose registers for use with operations that are defined by a set of instructions. The instructions are typically stored in an instruction memory and specify a set of hardware functions that are available on the processor. When implementing these functions, the processor generally processes "transient" data residing in a memory in accordance with the instructions.

A high-performance processing engine configured for use in, e.g., an intermediate network device may be realized by using a number of identical processors to perform certain tasks in parallel. For a parallel multi-processor architecture, each processor may have shared access to information stored in a common resource, such as a memory. Processor synchronization denotes serialization of access to the shared resource. In a multi-processor environment, processors that share data stored in the memory resource typically access that resource serially, rather than in parallel, in accordance with a processor synchronization mechanism to ensure that the data does not change from its expected state.

There are multiple mechanisms used for processor synchronization, many of which are based on the use of semaphores. A semaphore is a variable, such as a hardware or software flag, with a value that indicates the status of a common resource. To keep processors from interfering with one another, a semaphore may be used to lock the resource. In this context, the lock is an abstraction that represents permission to access the resource and, to that end, may be further viewed as a memory bit associated with the resource. If the bit is not asserted (e.g., "0"), the lock is free and if the bit is asserted (e.g., "1"), the lock is busy.

Lock (and unlock) requests are typically atomic in that they are implemented such that neither an interrupt nor a multiprocessor access affects the outcome. All processors that access a shared resource must obtain a lock that corresponds to that resource before manipulating its contents. A processor requesting the resource checks the lock to determine the resource's status and then decides how to proceed. If the lock is already held by another processor, the requesting processor must defer its access until the lock becomes available.

Resource contention arises when more than one processor attempts to request exclusive access to a single shared resource. A lock controller is a mechanism that may be used to determine which processor may obtain the requested resource. To that end, the lock controller selects one processor from among the plurality of requesting processors, typically in accordance with an arbitration policy. The other processors must then wait for the resource to be released before they can obtain access to it. This is an example of a blocking request for a lock controller. The processors waiting for the shared resource may continue to poll for that resource until it becomes available, i.e., until the lock on the resource "owned" by the selected processor is released. At that time, one of the pending processors is selected by the lock controller to obtain the requested resource and the remaining processors may again continue polling for that resource until it becomes available. A problem with polling for a shared resource is that other computer resources (such as processor cycles) are wasted; the present invention is directed to a mechanism and technique for alleviating this problem.

SUMMARY OF THE INVENTION

The present invention comprises a lock controller configured to support both blocking and non-blocking lock requests issued by processors of a processing engine when attempting to access a shared resource of an intermediate network device. The non-blocking lock controller capability provides a processor with the flexibility to obtain other shared resources if the requested resource is not available. This obviates the need for the processor to continually poll for the requested resource, thereby conserving processor cycles. On the other hand, the blocking capability of the lock controller guarantees that each processor will eventually obtain the requested resource. By supporting both blocking and non-blocking capabilities, the novel lock controller provides increased flexibility and performance to the processors of the processing engine.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 1:
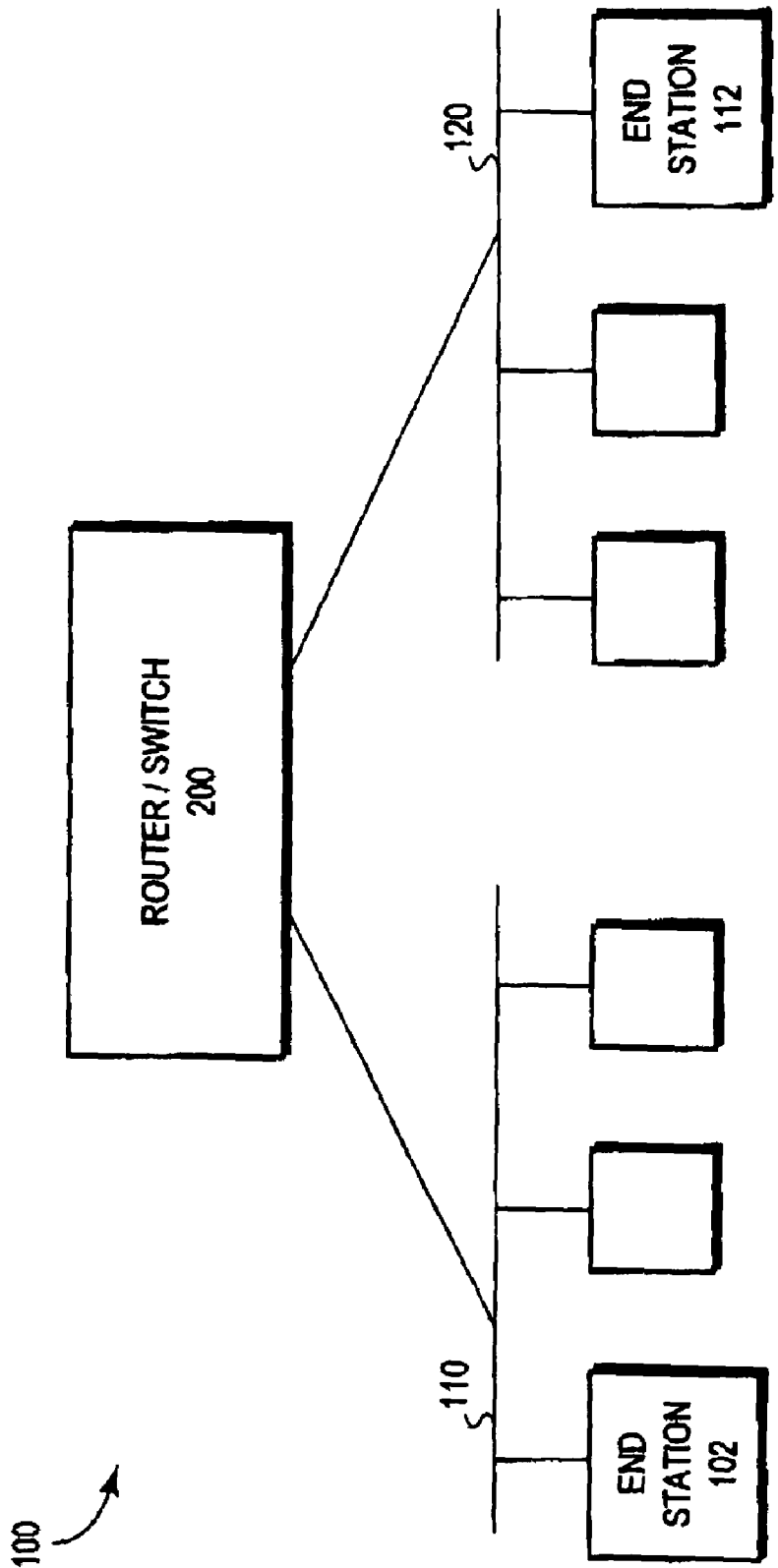
FIG. 1 is a block diagram of a computer network comprising a collection of interconnected communication media and subnetworks attached to a plurality of stations.

FIG. 1 is a block diagram of a computer network 100 comprising a collection of interconnected communication media and subnetworks attached to a plurality of stations. The stations are typically computers comprising endstations 102, 112 and intermediate station 200. The intermediate station 200 may be a router or a network switch, whereas the end stations 102, 112 may include personal computers or workstations. The subnetworks generally comprise local area networks (LANs) 110 and 120, although the invention may work advantageously with other communication media configurations such as point-to-point network links. Communication among the stations of the network is typically effected by exchanging discrete data frames or packets between the communicating stations according to a predefined protocol. For the illustrative embodiment described herein, the predefined protocol is the Internet protocol (IP), although the invention could be implemented with other protocols, such as the Internet Packet Exchange, AppleTalk or DECNet protocols.

Figure 2:
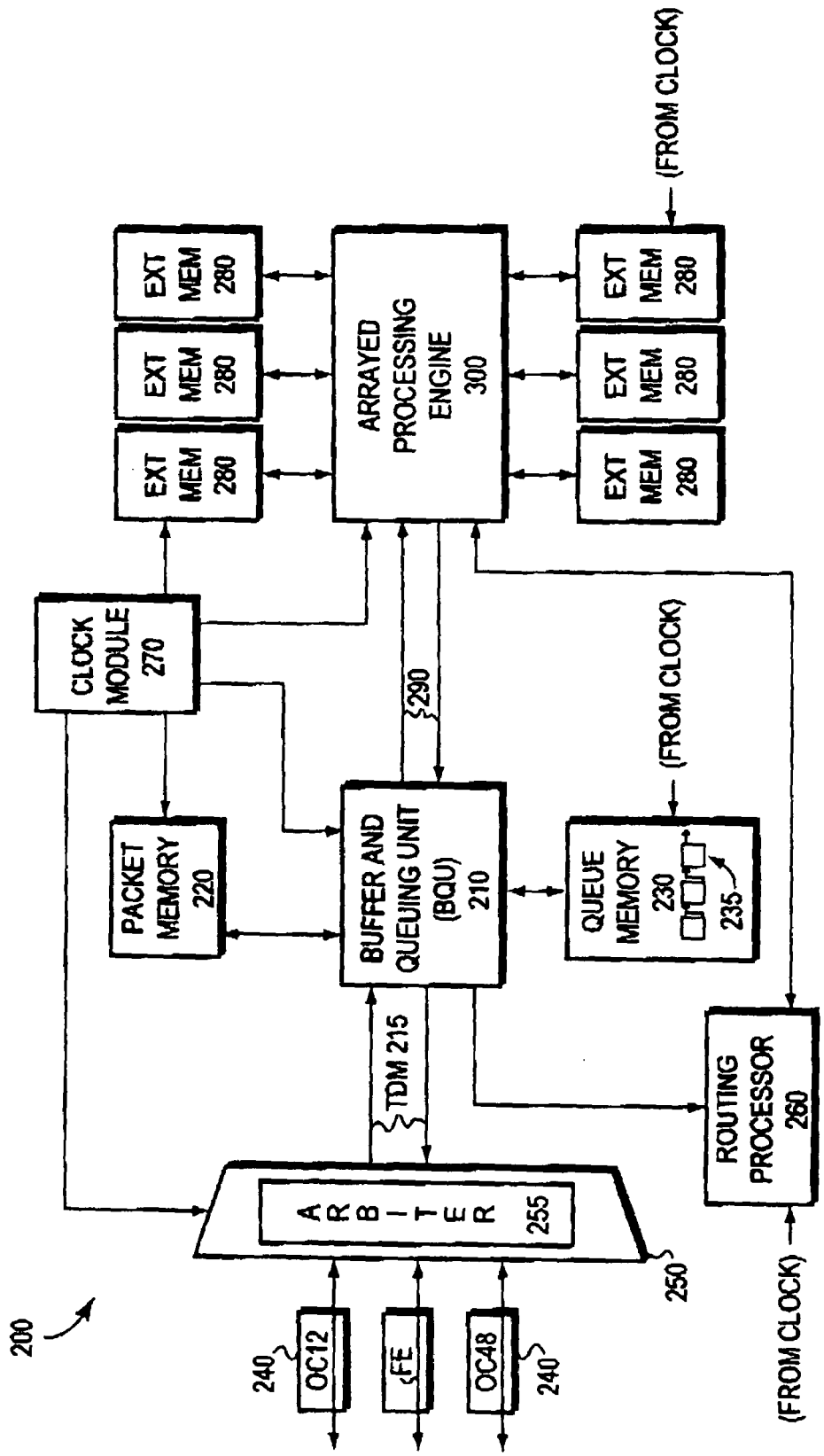
FIG. 2 is a schematic block diagram of intermediate station, such as a network switch, that may be advantageously used with the present invention.

FIG. 2 is a schematic block diagram of intermediate station 200 that, in the illustrative embodiment, is preferably a network switch. The switch generally performs layer 2 processing functions, such as "cut-through" operations wherein an entire frame does not have to be stored before transfer to a destination; in addition, switch 200 may implement layer 3 forwarding operations. It should be noted, however, that the intermediate station may also be configured as a router to perform layer 3 route processing. A feature of the architecture described herein is the ability to program the station for execution of layer 2, layer 3 or higher-layer operations. Operation of the switch will be described with respect to IP switching of packets, although the switch may be programmed for other applications, such as data encryption.

The switch 200 comprises a plurality of interconnected components including an arrayed processing engine 300, various memories, queuing logic 210 and network port interface cards 240. Operations of these components are preferably synchronously controlled by a clock module 270 although the arrayed elements of the processing engine may be operatively configured to function asynchronously. In the illustrative embodiment, the clock module 270 generates clock signals at a frequency of, e.g., 200 megahertz (i.e., 5 nanosecond clock cycles) and globally distributed them via clock lines to the components of the switch.

The memories generally comprise random access memory storage locations addressable by the processing engine and logic for storing software programs and data structures accessed by the components. An operating system, portions of which are typically resident in memory and executed by the engine, functionally organizes the switch by, inter alia, invoking network operations in support of software processes executing on the switch. It will be apparent to those skilled in the art that other memory means, including various computer readable media, may be used for storing and executing program instructions pertaining to the inventive technique and mechanism described herein.

The arrayed processing engine 300 is coupled to a memory partitioned into a plurality of external memory (Ext Mem) resources 280. A buffer and queuing unit (BQU) 210 is connected to a packet memory 220 for storing packets and a queue memory 230 for storing network layer headers of the packets on data structures, such as linked lists, organized as queues 235. The BQU 210 further comprises data interface circuitry for interconnecting the processing engine with a plurality of line cards 240 via a selector circuit 250 having an arbiter 255. The line cards 240 may comprise, e.g., OC12, OC48 and Fast Ethernet (FE) ports, each of which includes conventional interface circuitry that may incorporate the signal, electrical and mechanical characteristics, and interchange circuits, needed to interface with the physical media and protocols running over that media. A typical configuration of the switch may include many input/output channels on these interfaces, each of which is associated with one queue 235 in the queue memory 230. The processing engine 300 generally functions as a switching processor that modifies packets and/or headers as the BQU 210 implements queuing operations.

A routing processor 260 executes conventional routing protocols for communication directly with the processing engine 300. The routing protocols generally comprise topological information exchanges between intermediate stations to determine preferred paths through the network based on, e.g., destination IP addresses. These protocols provide information used by the processor 260 to create and maintain routing tables. The tables are loaded into the external partitioned memories 280 as forwarding information base (FIB) tables used by the processing engine to perform forwarding operations. When processing a header in accordance with IP switching, the engine 300 determines where to send the packet by indexing into the FIB using an IP address of the header. Execution of the forwarding operations results in destination media access control (MAC) addresses of the headers being rewritten by the processing engine to identify output ports for the packets.

Figure 3:
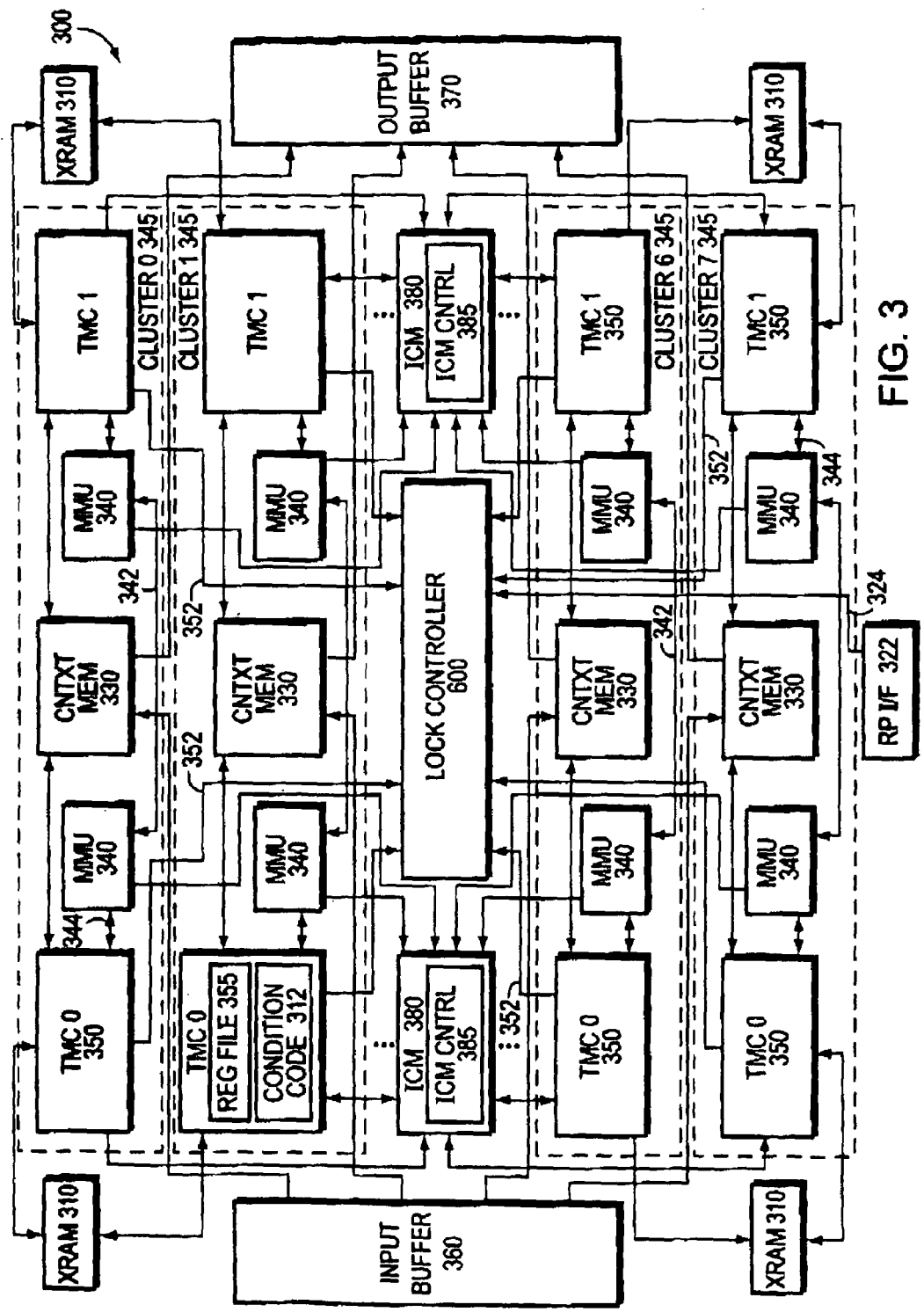
FIG. 3 is a schematic block diagram of a programmable arrayed processing engine having a plurality of processors configured as clusters.

FIG. 3 is a schematic block diagram of the programmable processing engine 300 which comprises an array of processors embedded between input and output buffers with a plurality of interfaces 310 from the array to partitions of an external memory. The external memory stores non-transient data organized within data structures for use in processing the transient data. The non-transient data typically includes "table" data contained in forwarding and routing tables, statistics, access filters, encryption keys and/or queuing information. The transient data enters and exits the engine via 100 MHz 64-bit input and output data interfaces of the BQU 210. A remote processor interface (I/F) 322 provides information, such as instructions and data, from a remote processor to the processors and buffers over a maintenance bus having multiplexed address/data lines.

The processing engine 300 comprises a plurality of processors 350 arrayed into multiple rows and columns; in the illustrative embodiment, the processors are arrayed as eight (8) rows and two (2) columns in an 8×2 arrayed configuration that is embedded between an input buffer 360 and an output buffer 370. However, it should be noted that other arrangements such as 4×4 or similar rectangularly arrayed configurations, may be advantageously used with the present invention. The processors of each row are connected to a context memory 330 and a plurality of memory management units (MMUs 340); collectively, these elements of the row are organized as a cluster 345.

Because they perform similar functions, the columned processors require similar non-transient "table" data. Therefore, the external memory is partitioned into a plurality of Ext Mem resources 280, each of which is dedicated to a respective column of processors. A plurality of internal memories 380, each dedicated to a respective column of processors, is also located on the processing engine 300. The Ext Mem 280 and internal column memory (ICM) 380 are configured with non-transient table data needed to support the similar function performed by the columned processors.

Specifically, each processor is a customized, single-threaded microcontroller (TMC) 350 having a dense structure that enables implementation of similar processors on an application specific integrated circuit. The present invention may apply to any number of processors within a column and, in fact, to a single processor with multiple threads of execution, each of which attempts to access a single shared resource. The TMC 350 is preferably a pipelined processor that includes, inter alia, a plurality of arithmetic logic units (ALUs) and a register file 355 having a plurality of 32-bit general purpose registers (GPRs) that store intermediate result information processed by the ALUs.

The TMC processors 350 of each cluster 345 execute operations on transient data loaded into the context memory 330 by the input buffer 360, whereas the processors of each column operate in parallel to perform substantially the same operation on the transient data, but with a shifted phase. The context memory 330 stores transient "context" data (e.g., packet/frame data) flowing through the cluster that is unique to a specific process, along with pointers that reference data structures and tables stored in Ext Mem 280 and ICM 380 for use by the TMC 350.

The processing engine 300 further includes a lock controller 600 associated with each column for purposes of providing lock access to shared resources associated with that column of processors in the engine, as described further herein. Each processor 350 communicates ("interfaces") with the lock controller over lock request lines 352, while the remote processor I/F 322 interfaces with the lock controller over lock request line 324. Each processor 350 of a cluster 345 further interfaces over a local bus 344 to a respective MMU 340. Each MMU 340 connects to an ICM 380 and an Ext Mem 280 associated with the column. Moreover, the MMUs within a cluster communicate over an intercommunication path 342 that enables a processor of one column to access a shared resource of another column.

In the illustrative embodiment, there are preferably two shared resources for each column of processors: the ICM 380 and the Ext Mem 280. Specifically, the shared resources include an ICM controller 385 coupled to the ICM 380 and an external memory (XRAM) controller 310 coupled to the Ext Mem 280. The XRAM controller 310 is preferably embodied as a 200 MHz external memory interface coupled to each column of processors, whereas the ICM controller 385 is preferably contained in each ICM resource 380. The controllers are configured to enable columned processor access to the non-transient data stored in the external and internal column memories.

The shared memories 280, 380 accessed by the processors may further comprise entries of relatively large data structures of the shared memories. These data structures, e.g., tables, are constantly updated and accessed by the processors of each column. An example of such a table structure is an IP address-to-interface translation table located in the ICM 380. As the processing engine "learns" new IP addresses, those addresses are loaded into the table and frequently accessed by the processors. Multiple processors can access the shared resource as long as each processor is accessing a different region of the resource.

In particular, the large tables may be apportioned into smaller subareas so that the probability of multiple processors accessing the same location of a subarea at the same time is low. For example, assume that the table contains 4000 entries, wherein each entry is associated with a channel or I/O port over which frames may be transmitted and received through the switch. The table may thus be logically divided into 4000 areas. A single semaphore bit used to lock the entire table would be inefficient since the processors are constantly accessing the table for purposes of transmitting/queuing frames through the switch.

In the illustrative embodiment, a virtual semaphore mechanism is provided that allows multiple processors to simultaneously access the shared memory resource. Preferably the shared resource is partitioned into variable size regions and each region is assigned a virtual semaphore identifier. The virtual identifier enables locking of a portion of the resource, rather than the entire resource. By apportioning the table into a fine granularity, the processors are allowed to operate independently and simultaneously on various locations therein to improve the performance of the processing engine since the probability of two processors accessing the same location at the same time is low.

As noted, a lock controller function 600 is associated with the columns of processors and operates in cooperating relation with lock instructions executed by the (TMC) processors. That is, the executed lock instructions manipulate the lock controller 600 to create a tightly integrated arrangement for generating lock requests directed to the shared resources. Each TMC processor may perform the following functions during a 64 processor cycle execution phase: issue a lock request, test the lock and then execute a function (e.g., an update) before clearing the lock. The processor may issue a virtual semaphore identifier as part of the lock request, wherein the identifier specifies a region of the shared resource for access by the processor. In the illustrative embodiment, the virtual identifier is a 12-bit value that enables an addressing granularity of 4096 locations in a shared resource. Notably, the 12-bit identifier value associated with the lock request and corresponding to the granularity of the shared resource is completely under software control and may, of course, assume other configurations.

A processor that issues a lock request for a particular area may not lock another area of the shared resource until it has cleared the previous lock. Each processor may concurrently issue four (4) independent lock requests, wherein each request is directed to a separate shared resource. In particular, there are four semaphore groups per column in the illustrative embodiment of the invention and each processor can issue four semaphore requests (one per group). An example of a group and virtual locking mechanism suitable for use with the present invention is described in copending and commonly-owned U.S. patent Ser. No. 09/432,464, now issued as U.S. Pat. No. 6,529,983 on Mar. 4, 2003 titled Group and Virtual Locking Mechanism for Interprocessing Synchronization, which application is hereby incorporated by reference as though fully set forth herein.

Figure 4:
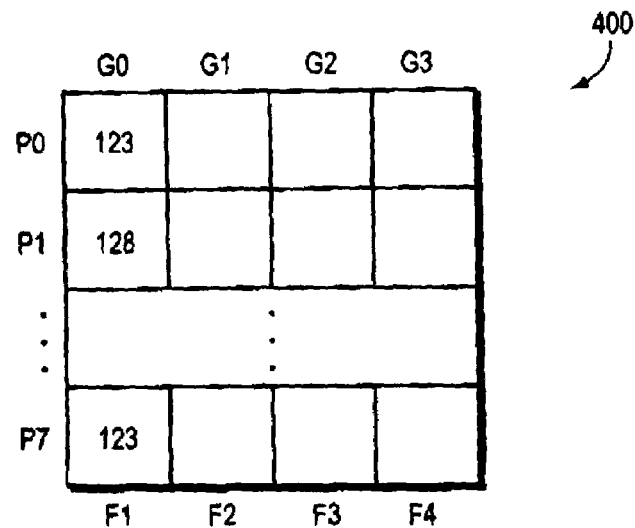
FIG. 4 is a schematic diagram of a lock control data structure that may be advantageously used with the present invention.

FIG. 4 is a schematic diagram of a lock control data structure 400 residing within the lock controller. The data structure (i.e., a table) depicts various groups G0–G3 that may be locked by each processor P0–P7 of a column. Each lock is associated with a particular function F1–F4 wherein each function is associated with a shared resource. For example, F1 may be associated with the ICM 380 and F2 may be associated with Ext Mem 280. As described further herein, a processor can lock a particular location in the first function (ICM) and, simultaneously, can lock a location in a second function (Ext Mem). The functions may further represent individual data structures within, e.g., ICM 380. In that case, F1 may be associated with the IP address-to-interface translation table, while F2 could be associated with another table in the ICM.

Assume processor P0 issues a lock request to lock a particular region of ICM 380. The lock request specifies the group and the virtual semaphore identifier corresponding to the region to be locked (e.g., G0, number 123). Simultaneously, P1 issues a lock request to lock the following region (G0, number 128). In this case the lock controller will grant both requests since they are non-competing requests (even though the same group is being addressed by the processors, they are seeking to lock different areas within a shared resource). If however P7 issues a lock request to lock area 123 in Group 0 (G0, number 123), then a conflict arises since both P0 and P7 are vying for the same shared resource. As a result, either P7 or P0 will be granted access to the resource and the other processor must wait for the resource to be released before it can obtain access to the resource. This is an example of a blocking request.

An arbiter function located within the lock controller 600 is invoked to resolve such contention for the shared resource. The arbiter may be configured to resolve multiple requests simultaneously and, in the case of collisions, grants the resource to the processor according to a predetermined arbitration policy. In the illustrative embodiment, the arbiter implements a first-come, first-serve arbitration priority policy. Alternatively, for the TMC architecture implementation that provides a staggered, shifted phase relationship among processors of a column, a priority policy may be implemented whereby P0 has priority over other processors of a column. In the absence of such a staggered phase relationship among the columned processors, a round robin or similar arbitration scheme may be implemented for resolving conflicts to the shared resource.

Assume that resolution of the conflict between P0 and P7 results in granting of the resource P0 and denial of the resource to P7. Rather than stalling P7 until the locked region is available, it is desirable to allow that processor to perform useful work until the requested resource is unlocked. To that end, the request for a lock is preferably decoupled from testing of the lock to thereby enable the processor to perform other activities. This is manifested by way of two separate instructions: one for requesting the lock and the other for testing the lock. Testing of the lock is manifested through use of condition bits of a condition code register 312 residing within the TMC processor 350. This enables a tightly coupled arrangement between the testing of the lock and the processor. By decoupling the testing of the lock from the request for the lock, the processor that was denied access can perform other activities and occasionally "poll" on the test lock to determine whether the resource is available. However, a problem with polling for a shared resource is that other computer resources (such as processor cycles) are wasted; the present invention is generally directed to a mechanism and technique for alleviating this problem.

In accordance with the present invention, an improved lock controller is provided that supports both blocking and non-blocking lock requests issued by the processors 350 when attempting to access a shared resource in network switch 200. Broadly stated, when a processor issues a blocking lock request for the shared resource and the resource is not available at that time, the lock request remains pending until the resource is available and the lock is granted. Although this capability of the lock controller guarantees that each processor will eventually obtain the requested resource, it precludes the processor from issuing another lock request to another shared resource until the pending request is granted. In addition, the blocking semaphore request requires the processor to "poll" on the lock to determine whether the resource is available. If many processors are requesting the same resource, the latency involved in accessing the resource may be substantial. An aging process may be employed to ensure fairness among the pending lock requests issued by the processors.

On the other hand, a non-blocking request queries the lock controller as to the availability of the resource at that instant and if the resource is not available, the processor may reissue the request at a later time. That is, the non-blocking semaphore request does not enter a pending state if the resource is not available. The non-blocking lock controller capability provides the processor with the flexibility to attempt to obtain another shared resource if the originally requested resource is not available. This, in turn, obviates the need for the processor to continually poll for the originally requested resource, thereby conserving processor cycles.

Thus if the shared resource must be obtained by the processor in order to proceed with program execution, a blocking semaphore request may be issued by the processor. However if the processor does not require the resource immediately and may proceed with other "work", then it may issue a non-blocking semaphore request for that resource. Notably in a blocking lock request mode, the processor may perform work other than that which requires access to a shared resource; yet once the original pending request for the shared resource becomes available, the processor must clear the lock whether or not it utilizes the shared resource. This results in wasted processor cycles and the present invention is directed, in part, to alleviating that situation.

To support efficient multiprocessor synchronization, the TMC architecture defines hardware semaphore requests/operations supported by the lock controller and each column of processors. The lock controller always grants a semaphore request when the resource is available. In the illustrative embodiment, the architecture defines a get virtual semaphore instruction (xgvs) that generally comprises a single, 4-bit group select (lock group) parameter and a 12-bit virtual lock identifier. As noted, the virtual identifier enables locking of a portion of the resource, rather than the entire resource. A processor can only "own" one virtual semaphore per lock group, although each processor can be granted a virtual semaphore with the same group as long as the virtual lock identifiers are different.

The TMC architecture also defines a get binary semaphore (xgbs) instruction that generally comprises a lock group parameter that enables locking of the entire group (function) denoted by a bit-mapped lock group parameter value. The lock controller preferably supports four binary semaphores per column with four lock groups. Each processor or the remote processor can request one or more binary semaphores per lock request. A pending multiple group binary semaphore request with resources locked by another processor does not prevent another semaphore request from being granted. However a binary semaphore cannot be granted if a virtual semaphore is owned for the group being requested; likewise, a virtual semaphore cannot be granted if a binary semaphore is owned for the group being requested. A pending multiple group binary semaphore request will only be granted when all resources are available to prevent a deadlock situation.

According to the invention, additional operand parameters are provided for the xgvs and xgbs instructions of the TMC instruction set. These novel parameters comprise a blocking/non-blocking operand and a scope operand, the latter specifying either a shared resource associated with a column of processors (scope=COLUMN) or any shared resource within the processing engine (scope=CHIP). These novel operand capabilities enable a "dynamic blocking" configuration as opposed to a static arrangement wherein a configuration flag is asserted to specify the particular blocking/non-blocking mode.

For example, refer to the following program code segments involving the xgbs instruction.

```
1 Blocking binary lock request xgbs BLOCK, CHIP, 0x2;    //Get chip blocking lock for group 1
noop;                     //Wait for lock result to reflect latest
                            request
wait_for_lock:
bcf cr_lrslt, wait_for_lock  //Wait for chip lock to be granted
cdsbt;
//Chip binary lock granted for group 1
2 Non-blocking binary lock request xgbs NON_BLOCK, CHIP, 0x8;  //Get chip non-blocking binary
                              lock
noop;
noop;
noop;
bct cr_lrslt, got_chip_lock
cdsbt;
//Did not obtain chip binary lock for group 3
got_chip_lock:      //Obtained binary chip lock for group 3
```

In accordance with the invention, the xgbs instruction (#2) may be executed by a processor to issue a non-blocking request (NON_BLOCK) for any shared resource of the processing engine (scope=CHIP). Once the blocking request is issued, the code specifies waiting a period of time for the lock result to reflect normal processing of the lock request. If the request is successful, program execution jumps to a particular code segment in accordance with a branch on condition true (bct) instruction that specifies interrogating an appropriate condition register to determine the state of the lock result (cr_lrslt). The particular code segment is identified by the label, got_chip_lock.

The xgbs instruction (#1) may also be executed by a processor to issue a blocking request (BLOCK) for a shared resource of the processing engine (scope=CHIP). Once the blocking request is issued, the code specifies waiting a period of time for the lock result to reflect normal processing of the lock request. If the request is not successful, program execution proceeds to waiting until the resource becomes available ("spinning on the lock") in accordance with a branch on condition false (bcf) instruction that specifies interrogating an appropriate condition register to determine the state of the lock result (cr_lrslt). The spin code segment is identified by the label, wait_for_lock.

Although the locked resource may eventually become available, the processor may not be able to utilize it because, e.g., the time remaining for the processor to operate on the shared resource within its execution phase is insufficient. That is, there is only a fixed period of time within an execution phase at which a processor can execute instructions. If that available "window" of time is insufficient for the processor to execute its operations, the processor cannot utilize the resource even though it may be available as a result of the lock request. Yet although it may no longer need the resource, the processor must wait until it receives the granted lock and then clear that lock in accordance with a clear semaphore (xcs) instruction. The time spent waiting on and then clearing the lock amounts to wasted processor cycles and the present invention is further directed, in part, to addressing this situation.

Specifically, the non-blocking lock request capability of the lock controller allows the processor to perform other work if its initial attempt to obtain a shared resource is unsuccessful. The processor thus does not have to be concerned with the "housekeeping" responsibility of clearing a granted lock that was previously in a pending state as required in accordance with the blocking mode. If the non-blocking lock request is denied, the processor need merely reissue a lock request at a later time if it still desires access to the shared resource.

Figure 5:
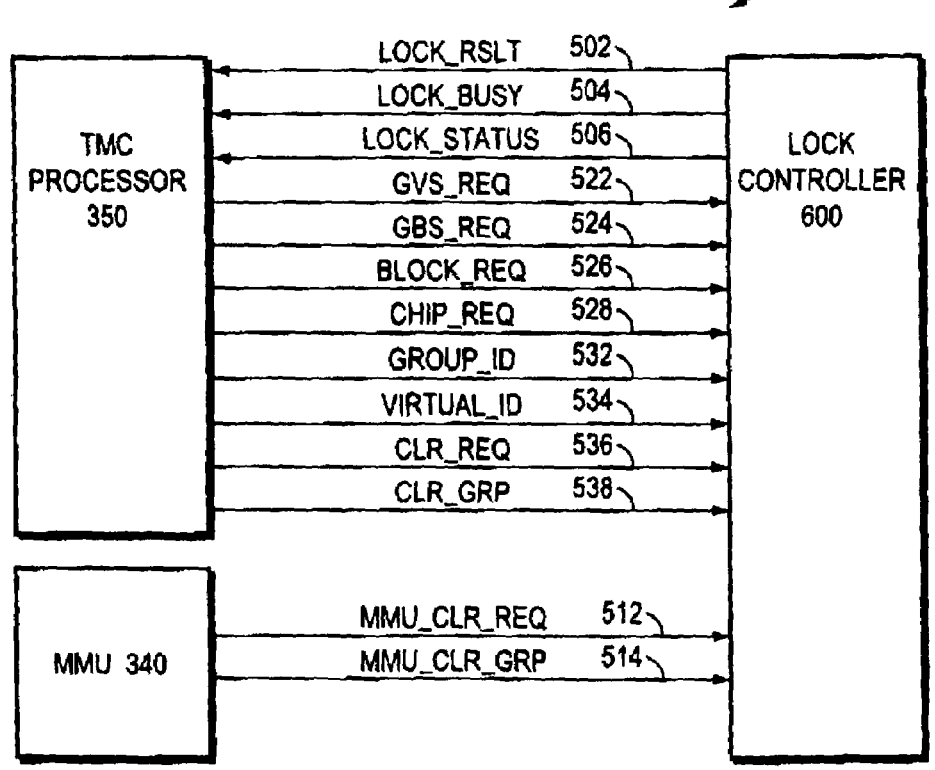
FIG. 5 is a schematic block diagram of an interface between the lock controller and a processor/memory management unit of each cluster in the processing engine.

FIG. 5 is a schematic block diagram of an interface 500 between the lock controller 600 and a processor 350 of each cluster 345 in the processing engine 300, and between the lock controller and a MMU 340 of each cluster. The signals issued by the lock controller to the processor include a lock result (lock_rslt) signal 502, a lock busy (lock_busy) signal 504 and a 4-bit lock status (lock_status) signal 506. The lock_rslt signal 502 is a summary of the overall request (either denied or granted), whereas the lock_status signals 506 indicate the individual group status on a per lock basis. In addition, the interface enables the exchange of signals between a MMU 340 and lock controller 600 for purposes of clearing locks. These signals include a MMU clear request (mmu_clr_req) signal 512 and a 4-bit MMU clear group (mmu_clr_grp) signal 514.

The interface 500 further comprises a plurality of signals exchanged between the processor and the lock controller. In the illustrative embodiment, the signals issued by the processor to the lock controller include a get virtual semaphore request (gvs_req) signal 522, a get binary semaphore request (gbs_req) signal 524, a block/non-blocking request (block_req) signal 526 and a chip/column request (chip_req) signal 528. In addition, a 4-bit group identification (group_id) signal 532, a 12-bit virtual identifier (virtual_id) signal 534, a clear request (clr_req) signal 536 and a 4-bit clear group (clr_grp) signal 538 are issued by the processor to the controller.

Figure 6:
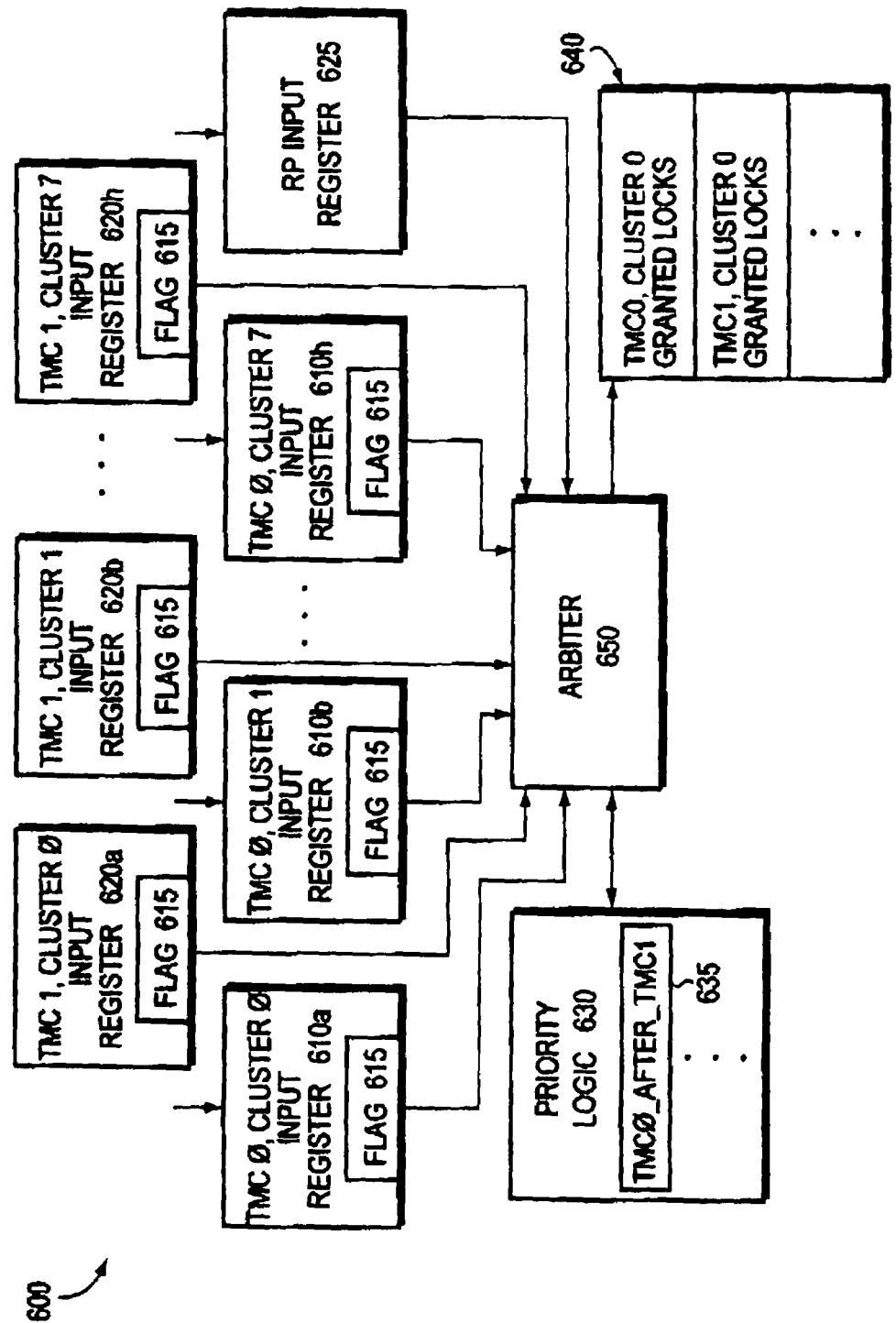
FIG. 6 is a highly schematic block diagram of the lock controller in accordance with the present invention.

FIG. 6 is a schematic block diagram of the novel lock controller 600 comprising a plurality of input registers 610a–h and 620a–h, each associated with a processor of a column (TMC0, TMC1), and input register 625 associated with the remote processor. Each input register receives information associated with an incoming lock request and effectively translates that incoming request to a pending lock request. The lock controller also includes a data structure (e.g., a list 640) of granted locks per processor. As noted, each processor is provided with four locks and these locks are associated with the four groups of shared resources.

The lock controller 600 also includes priority logic 630 that is age-based for all resources of a requesting processor that are available. In the illustrative embodiment described herein, the oldest request is assigned the highest priority. Broadly stated, when a processor issues a lock request for a particular resource, the priority logic 630 is manipulated to indicate that the particular processor is the last requestor for that resource. For example, if a processor (e.g., TMC0) issues a lock request for a particular resource, the content of a priority register within logic 630, denoted TMC0_after_TMC1, is asserted to indicate that TMC0's request came after another TMC (e.g., TMC1). A plurality of these priority registers 635 is provided within priority logic 630 wherein the registers represent the combination of each TMC with respect to every other TMC of a column. The states of each of these registers are asserted after the TMC0 lock request is received at the lock controller. On the other hand, if a lock request from TMC1 is received at the lock controller for the particular resource, then the TMC0_after_TMC1 register is de-asserted.

The lock controller further comprises an arbiter 650 that determines the next lock request to be granted to a shared resource. In the illustrative embodiment, a number of factors are considered when determining the next granted lock request; for example, the arbiter considers the states of each entry in the list 640 of granted locks per processor. As described further herein, the states of the entries within the list 640 constitute lock status information that is provided to the processors in response to their lock requests.

Where multiple processors simultaneously request access to a shared resource, the arbiter grants the resource to a particular processor depending upon the states of the priority registers in accordance with an arbitration policy. The arbitration policy is preferably a strict priority arrangement wherein processor 0 has priority over all other processors of a column. However if there are no simultaneous requests for the resource by multiple processors, then the priority logic is not interrogated by the arbiter. That is, the arbiter considers the priority logic only when multiple processors are vying for the same shared resource.

As noted, the lock controller 600 provides lock result and lock busy signals 502, 504 to the requesting processor 350 in response to its lock request. The lock busy signal 502 indicates that the controller is working on a pending lock request from that processor, while the lock result 504 indicates that the last lock request has been granted. A 4-bit lock status 506 is also provided by the lock controller to the requesting processor indicating which resource group is locked by the processor. The lock result, lock busy and lock status signals are updated every cycle and provided to a condition register 312 within each processor. The condition register in the TMC processor is a mechanism used to coordinate all external hardware when communicating status information.

Specifically, assertion of the lock busy signal 504 denotes that the lock status bits 506 should not be interpreted by the requesting processor because a decision as to whether the request is accepted or denied has not yet been rendered by the arbiter 650. Thus, a blocking request issued by a processor remains in the input register 610 as a pending request until the resource is available and the request is granted by the lock controller. At that time, the state of the lock busy signal 504 changes and the lock status bits 506 may be examined by the processor. Moreover, deassertion of the lock busy signal informs the processor that it is free to issue another lock request for a shared resource. Notably when the lock busy signal is asserted, the processor is unable to issue another lock request for a shared resource.

In the non-blocking mode, the lock request remains in a pending state for only one cycle (or the number of cycles needed for the arbiter 650 to render a decision on the shared resource). Whether a request is a blocking or non-blocking request is determined by the state of a flag 615 transferred from the processor to the input register 610, 620 of the lock controller 600. If the request is a non-blocking request, the flag is asserted (or not asserted) to indicate that the request can be cleared after the cycle (or cycles) needed for the arbiter to act on the request. If the request is a blocking request, the flag 615 is not asserted (or asserted) to indicate that the request should remain in a pending state until the arbiter grants the request.

In general, each processor of a column may request access to a shared resource within that column through the lock controller. However, a processor associated with a column may further request a shared resource associated with another column as long as the processor locks the same shared resource in both columns simultaneously. According to the present invention, the processor may access a shared resource of another column by issuing a global binary semaphore request that attempts to obtain a group lock in both columns of processors.

Specifically, the processor associated with a column, e.g., column 0 (TMC0 of each cluster 345), may request access a shared resource within another column, e.g., column 1 (TMC1 of each cluster 345) by issuing the global semaphore lock request specifying a global, e.g., CHIP, scope parameter. The binary lock request specifying the CHIP scope operand is only granted if the lock group is available for both columns at the same time. If a global semaphore blocking request is issued and both resources are not available, the processor "spins" on the lock until it becomes available. If a non-blocking mode is specified, the processor must reissue the lock request at a later time and the lock controller determines whether both resources are available.

In the illustrative embodiment, a single lock controller 600 is preferably provided to support both columns of processors to efficiently implement the CHIP lock feature of the present invention. However, in an alternate embodiment of the invention, a lock controller may be provided for each column of processors in the processing engine. For such an alternate embodiment, an intercontroller communication interface is needed to enable interaction between the lock controllers when managing lock requests issued by the processors of each column. On the other hand, a single lock controller acquires all pending and existing lock requests, and can manage those requests fast and efficiently.

For example, assume TMC0 of cluster 0 issues a CHIP lock request for Group 0 and, in the same cycle, TMC0 of cluster 1 issues a CHIP lock request for Group 1. A single lock controller can efficiently grant both requests (from processors of the same column) in the same cycle, whereas a simple embodiment of multiple lock controllers can only grant both requests in sequential cycles. However, a more complex multiple lock controller embodiment having an intercontroller communication interface that supports multiple lock requests per cycle can be configured to grant both requests in the same cycle.

As noted, there are four (4) lock groups associated with each processor in a column; therefore, the lock controller 600 has 4 lock groups associated with the processors of column 0 (i.e., TMC0) and 4 lock groups associated with the processors of column 1 (i.e., TMC1). As also noted, a COLUMN lock request is directed to one or more lock groups within a particular column, whereas a CHIP lock request is directed to one or more lock groups in both columns 0 and 1. The CHIP lock request sets the pending input registers for lock groups in both columns; however, this request will not be granted until the resources for those lock groups are available.

Operation of the novel lock controller 600 will now be described in connection with the program code segments and the drawings. Assume a processor, e.g., TMC0, executes an xgbs instruction specifying BLOCK and CHIP operand parameters, along with a group identification parameter of 0×2, i.e., 2 (hex). To that end, the gbs_req signal 524, the block_req signal 526, the chip_req signal 528 and the appropriate group_id signals 532 are asserted by the processor and transmitted to the lock controller where they are received at the TMC0 pending input register 610a. The lock controller 600 returns a lock_busy signal 504 indicating that it is working on a pending lock request. Once the resource is granted, the lock controller asserts the lock_rslt signal 502 along with the appropriate lock_status bits 506 and forwards them to TMC0. Since the request is a blocking lock request, it remains in a pending state until the requested resource is granted.

Meanwhile, the arbiter 650 determines whether the incoming lock request should be granted access to the shared resource. When both shared resources in both columns are available, the arbiter returns the lock_status signal 506 to TMC0 indicating that the resource is granted to that processor. In addition, the lock_rslt and lock_busy signals 502, 504 are provided from the arbiter to the condition register 312 in the TMC0. The bcf instruction references the condition register and, in particular, the state of the lock_rslt signal 502 while waiting for the CHIP lock to be granted. As noted, these signals together with the lock_status signals 506 are updated every cycle to the condition register 312 which is used to coordinate external hardware activities when communicating status information. Program execution may branch on that information to determine whether the locks are successfully obtained.

While there has been shown and described an illustrative embodiment of a lock controller configured to support both blocking and non-blocking lock requests issued by processors of a processing engine when attempting to access a shared resource of an intermediate network device, it is to be understood that various other adaptations and modifications may be made within the spirit and scope of the invention. For example, if a processor, such as TMC0, issues a blocking lock request, the request remains in a pending state until the requested resource is granted. Once TMC0 is granted and then finishes using the shared resource, it must clear the lock/semaphore. According to the invention, either the processor can explicitly clear the semaphore or the MMU can clear the semaphore. Broadly stated, the MMU 340 may be employed to clear the semaphore when the lock request is tied to a memory access operation.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for accessing a shared resource of an intermediate network device having a plurality of processors capable of attempting access to the shared resource, the method comprising the steps of:
    providing a lock controller hardware device having logic with both blocking and non-blocking lock request capabilities for selecting a processor from among the plurality of processors attempting to access the shared resource;
    executing a semaphore instruction at the at least one processor, the semaphore instruction associated with the lock requests to enable locking of the shared resource; and
    providing a blocking/non-blocking operand as a parameter of the semaphore instruction, the blocking/non-blocking operand distinguishing the blocking and non-blocking lock request associated with the semaphore instruction;
    and one of either,
    issuing a blocking lock request from at least one processor to the lock controller, the blocking request remaining pending at the lock controller until the shared resource is available, if the resource is not immediately available requiring the processor to poll the lock controller to determine when the resource is available, and precluding the processor from issuing another lock request to another shared resource until the pending blocking lock request is granted, and
    issuing a non-blocking lock request from the at least one processor to the lock controller, the non-blocking request querying the lock controller as to the immediate availability of the shared resource if the resource is not available enabling the processor to reissue the non-blocking lock request at a later time.

2. The method of claim 1 wherein the step of issuing a non-blocking lock request further comprises enabling the processor to obtain another shared resource if the requested resource is not immediately available, thereby obviating a requirement for the processor to poll for the requested resource.

3. The method of claim 1 wherein the step of executing a semaphore instruction comprises the step of executing a get virtual semaphore instruction having a group select parameter and a virtual lock identifier, the virtual lock identifier enabling locking of a portion of the shared resource rather than the entire resource.

4. The method of claim 1 wherein the step of executing a semaphore instruction comprises the step of executing a get binary semaphore instruction having a lock group parameter, the get binary semaphore instruction enabling locking of the entire shared resource.

5. A method for accessing a predetermined shared resource of an intermediate network device having a plurality of processors arrayed into columns and capable of attempting access to the shared resource, the method comprising the steps of:
    providing a plurality of lock controller hardware devices having logic with both blocking and non-blocking lock request capabilities for selecting a processor from among the plurality of processors attempting to access the shared resource, each lock controller associated with (i) a column of processors and (ii) shared resources associated with that column of processors;
    executing a semaphore instruction at the at least one processor, the semaphore instruction associated with the lock requests to enable locking of the predetermined shared resource; and
    providing a blocking/non-blocking operand as a parameter of the semaphore instruction, the blocking/non-blocking operand distinguishing the blocking and non-blocking lock request associated with the semaphore instruction;
    and one of either,
    issuing a blocking lock request from at least one processor to its associated lock controller, the blocking request remaining pending at the lock controller until the predetermined shared resource is available and, if the resource is not immediately available, requiring the processor to poll the lock controller to determine when the resource is available, the blocking lock request further precluding the processor from issuing another lock request to another shared resource until the pending blocking lock request is granted; and
    issuing a non-blocking lock request from the at least one processor to its lock controller, the non-blocking request querying the lock controller as to the immediate availability of the predetermined shared resource and, if the resource is not available, enabling the processor to reissue the non-blocking lock request at a later time, the non-blocking lock request further enabling the processor to obtain another shared resource if the predetermined resource is not immediately available, thereby obviating a requirement for the processor to poll for the predetermined resource.

6. The method of claim 5 further comprising the step of providing a scope operand as a parameter of the semaphore instruction, the scope parameter specifying one of a shared resource associated with a column of processors and a shared resource within any column of processors.

7. The method of claim 5 further comprising the step of invoking an arbiter function within the lock controller to resolve contention for the shared resource among the plurality of processors attempting to access the shared resource.

8. Apparatus for accessing a shared resource of an intermediate network device, the apparatus comprising:
a plurality of processors capable of attempting access to the shared resource, each processor executing a semaphore instruction associated with a lock request to enable locking of the shared resource, the semaphore instruction including a blocking/non-blocking operand parameter that distinguishes a blocking lock request from a non-blocking lock request; and
a lock controller having blocking and non-blocking lock request capabilities for selecting a processor from among the plurality of processors attempting to access the shared resource;
if the processor issues a blocking lock request, the blocking request remaining pending at the lock controller until the shared resource is available, if the resource is not immediately available requiring the processor to poll the lock controller to determine when the resource is available, precluding the processor from issuing another lock request to another shared resource until the pending blocking lock request is granted;
if the processor issues a non-blocking lock request, and if the resource is not available, enabling the processor to reissue the non-blocking lock request at a later time.

9. A router comprising:
a plurality of processors capable of attempting to access a shared resource;
a hardware lock controller having blocking and non-blocking lock request capabilities for selecting a processor from among the plurality of processors attempting to access the shared resource; and one of either,
a semaphore system implemented as a plurality of bits in the hardware lock controller to control a blocking lock request from at least one processor to the lock controller, the blocking request remaining pending at the lock controller until the shared resource is available, and
the semaphore system implemented as a plurality of bits in the hardware lock controller to control a non-blocking lock request from the at least one processor to the lock controller, the non-blocking request querying the lock controller as to the immediate availability of the shared resource, if the resource is not available enabling the processor to reissue the non-blocking lock request at a later time.

10. The apparatus of claim 9 further comprising:
means for the hardware lock controller to, if the resource is not immediately available require the processor to poll the lock controller to determine when the resource is available, and preclude the processor from issuing another lock request to another shared resource until the pending blocking lock request is granted.

11. A method of operating a router, comprising:
providing a plurality of processors capable of attempting to access a shared resource;
providing a hardware lock controller having blocking and non-blocking lock request capabilities for selecting a processor from among the plurality of processors attempting to access the shared resource; and one of either, controlling by a semaphore system as a plurality of bits in the hardware lock controller a blocking lock request from at least one processor to the lock controller, the blocking request remaining pending at the lock controller until the shared resource is available, and
controlling by the semaphore system as a plurality of bits in the hardware lock controller a non-blocking lock request from the at least one processor to the lock controller, the non-blocking request querying the lock controller as to the immediate availability of the shared resource, if the resource is not available enabling the processor to reissue the non-blocking lock request at a later time.

12. A router, comprising:
a plurality of processors capable of attempting to access a shared resource;
means for a hardware lock controller having blocking and non-blocking lock request capabilities for selecting a processor from among the plurality of processors attempting to access the shared resource; and one of either,
means for controlling by a semaphore system as a plurality of bits in the hardware lock controller a blocking lock request from at least one processor to the lock controller, the blocking request remaining pending at the lock controller until the shared resource is available, and
means for controlling by the semaphore system as a plurality of bits in the hardware lock controller a non-blocking lock request from the at least one processor to the lock controller, the non-blocking request querying the lock controller as to the immediate availability of the shared resource, if the resource is not available enabling the processor to reissue the non-blocking lock request at a later time.

13. A method for accessing a shared resource of an intermediate network device having a plurality of processors capable of attempting access to the shared resource, the method comprising the steps of:
providing a lock controller hardware device having a plurality of input registers and an arbiter circuit, the lock controller having blocking and non-blocking lock request capabilities for selecting a processor from among the plurality of processors attempting to access the shared resource;
executing a semaphore instruction at the at least one processor, the semaphore instruction associated with the lock requests to enable locking of the shared resource; and
providing a blocking/non-blocking operand as a parameter of the semaphore instruction, the blocking/non-blocking operand distinguishing the blocking and non-blocking lock request associated with the semaphore instruction;
and one of either
issuing a blocking lock request from at least one processor to the lock controller, the blocking request remaining pending at the lock controller until the shared resource is available, and
issuing a non-blocking lock request from the at least one processor to the lock controller, the non-blocking request querying the lock controller as to the immediate availability of the shared resource.

14. The method of claim 13 wherein the step of issuing a block lock request further comprises the step of:
   if the resource is not immediately available, requiring the processor to poll the lock controller to determine when the resource is available.

15. The method of claim 13 wherein the step of issuing a block lock request further comprises the step of:
   precluding the processor from issuing another lock request to another shared resource until the pending blocking lock request is granted.

16. The method of claim 13 wherein the step of issuing a non-blocking lock request further comprises the step of:
   if the resource is not available, reissuing the non-blocking lock request at a later time.

17. The method of claim 13 wherein the step of executing a semaphore instruction comprises the step of:
   executing a get virtual semaphore instruction having a group select parameter and a virtual lock identifier, the virtual lock identifier enabling locking of a portion of the shared resource rather than the entire resource.

18. The method of claim 13 wherein the step of executing a semaphore instruction comprises the step of:
   executing a get binary semaphore instruction having a lock group parameter, the get binary semaphore instruction enabling locking of the entire shared resource.

19. Apparatus for accessing a shared resource of an intermediate network device, the apparatus comprising:
   a plurality of processors capable of attempting access to the shared resource, each processor executing a semaphore instruction associated with a lock request to enable locking of the shared resource, the semaphore instruction including a blocking/non-blocking operand parameter that distinguishes a blocking lock request from a non-blocking lock request; and
   a lock controller having blocking and non-blocking lock request capabilities for selecting a processor from among the plurality of processors attempting to access the shared resource.

20. A computer readable media containing instructions for execution on a processor, the computer readable media comprising:
   a semaphore instruction for use with a lock controller having blocking and non-blocking lock request capabilities, the semaphore instruction associated with a lock request to enable locking of a shared resource, the semaphore instruction including a blocking/non-blocking operand parameter that distinguishes a blocking lock request from a non-blocking lock request.

21. A method for accessing a shared resource of an intermediate network device, the method comprising:
   a plurality of processors capable of attempting access to the shared resource, each processor executing a semaphore instruction associated with a lock request to enable locking of the shared resource, the semaphore instruction including a blocking/non-blocking operand parameter that distinguishes a blocking lock request from a non-blocking lock request; and
   selecting a processor, by a lock controller having blocking and non-blocking lock request capabilities, the processor from among the plurality of processors attempting to access the shared resource.

22. Apparatus for accessing a shared resource of an intermediate network device, the apparatus comprising:
   a plurality of processing means attempting to access the shared resource, each processing means executing a semaphore instruction associated with a lock request to enable locking of the shared resource, the semaphore instruction including a blocking/non-blocking operand parameter that distinguishes a blocking lock request from a non-blocking lock request; and
   means for selecting a processing means from among the plurality of processing means attempting to access the shared resource, the means for selecting having blocking and non-blocking lock request capabilities.

* * * * *